(12) United States Patent
Gostling (10) Patent No.: US 7,433,149 B1
(45) Date of Patent: *Oct. 7, 2008

(54) MEDIA SURFACE WITH SERVO DATA IN CUSTOMER DATA REGION

(75) Inventor: Edward M. Gostling, Longmont, CO (US)

(73) Assignee: Maxtor Corporation, Scotts Valley, CA (US)

( * ) Notice: Subject to any disclaimer, the term of this patent is extended or adjusted under 35 U.S.C. 154(b) by 102 days.

This patent is subject to a terminal disclaimer.

(21) Appl. No.: 11/343,704

(22) Filed: Jan. 30, 2006

Related U.S. Application Data (63) Continuation of application No. 09/454,125, filed on Dec. 3, 1999, now Pat. No. 6,992,854.

(51) Int. Cl.
*G11B 15/46* (2006.01)

(52) U.S. Cl. .................. 360/77.08; 360/77.04

(58) Field of Classification Search .......... None
See application file for complete search history.

(56) References Cited

U.S. PATENT DOCUMENTS

| 4,714,967 | A | 12/1987 | Bizjak .......................... 360/48 |
| 5,210,660 | A | 5/1993 | Hetzler ......................... 360/51 |
| 5,587,850 | A | 12/1996 | Ton-that ................... 360/77.08 |
| 5,754,351 | A | 5/1998 | Kuen et al. .................... 360/48 |
| 5,856,986 | A | 1/1999 | Sobey ....................... 371/27.7 |
| 6,493,173 | B1 | 12/2002 | Kim et al. ................. 360/77.04 |

*Primary Examiner*—Andrea L Wellington
*Assistant Examiner*—Varsha A. Kapadia
(74) *Attorney, Agent, or Firm*—Fellers, Snider, et al.

(57) ABSTRACT

A disk drive stores overhead information corresponding to multiple servo sectors within a dedicated data sector in a customer data region of a data storage disk. The overhead information includes servo data for which the information content does not depend upon the physical location of the data on the disk surface. During a data storage operation, the overhead data is read from the dedicated data sector and stored in a buffer memory within the disk drive. A portion of the overhead data is then retrieved from the buffer memory for each servo sector subsequently traversed by the transducer for use in performing a data processing task related to the servo sector.

25 Claims, 4 Drawing Sheets

MEDIA SURFACE WITH SERVO DATA IN CUSTOMER DATA REGION

CROSS-REFERENCE TO RELATED APPLICATION

This is a continuation of U.S. patent application Ser. No. 09/454,125 filed Dec. 3, 1999 now U.S. Pat. No. 6,992,854, which is incorporated herein by reference in its entirety.

FIELD OF THE INVENTION

The invention relates generally to data storage systems and, more particularly, to disk-based data storage systems.

BACKGROUND OF THE INVENTION

A disk drive is a data storage device that stores data in concentric tracks on a disk shaped medium (i.e., a disk). A disk drive is generally used as a mass storage device for an external host computer that is connected to the disk drive via an input/output port. During normal disk drive operation, the host computer delivers an access request (i.e., a read request or a write request) to the disk drive requesting a transfer of customer data between the host computer and the disk. The disk drive then performs the requested data transfer by performing either a read operation (where data is transferred from the disk to the host computer) or a write operation (where data is transferred from the host computer to the disk). In the access request, the host computer generally indicates a location on the disk surface from/to which the customer data is to be transferred. For example, the host computer can specify a target track and sector on the disk or it can indicate a logical block address from which a target track and sector can be calculated. The disk drive then moves a transducer to a position above the identified disk location and the transfer of customer data is initiated.

In addition to customer data, the surface of the disk in a disk drive normally includes some non-customer data (i.e., overhead data) to facilitate proper disk drive operation. For example, the disk surface usually includes servo data for use by the disk drive to position the transducer during read and write operations. The servo data can include among other things: coarse position information (e.g., track address), and fine position information (e.g., servo bursts) for use in determining transducer position, and correction information (e.g., embedded runout correction (ERC) values) for use in compensating for rotational peculiarities in the disk structure. During disk drive operation, the transducer periodically reads the servo data from the surface of the disk. The disk drive then uses the servo data to appropriately move the transducer to the desired position.

As can be appreciated, proper disk drive operation depends on the accurate and reliable reproduction of the servo data written on the disk. Servo data has traditionally been written in radially aligned servo spokes occurring at equal intervals about the circumference of the disk. The servo spokes are generally written during disk drive manufacture by a highly accurate and very expensive piece of equipment known as a servo track writer (STW). Accordingly, the servo spokes cannot be modified by the customer after disk drive delivery (i.e., they are read-only). In addition, the information within the servo spokes is written at a different (i.e., lower) frequency from the other data on the disk surface. Servo spokes have traditionally included a minimal level of error detection capability, usually comprising a single parity bit. In contrast, customer data regions have generally used very sophisticated error detection/correction schemes to insure data integrity.

An ongoing trend in the disk drive industry is to store an ever increasing amount of data within a given area on a disk surface (i.e., to increase disk data densities). Along with this increase in data density comes an increase in the difficulty with which servo data can be accurately reproduced and utilized. Thus, current methods for storing servo information on the disk surface are rapidly becoming inadequate. In addition, current methods are generally expensive to implement (e.g., STW costs) and do not permit servo re-calibrations to be performed in the field. Current methods also make inefficient use of disk space as all servo information is generally written at a lower frequency and thus takes up a greater amount of disk surface area.

Therefore, there is need in the disk drive industry for new techniques for arranging and using servo data in a disk drive. The techniques will preferably be highly reliable for use in high capacity disk drives and should be relatively inexpensive to implement. In addition, the techniques will preferably allow servo re-calibrations to be performed in the field. Furthermore, it is desirable that the techniques make relatively efficient use of disk surface space.

SUMMARY OF THE INVENTION

The present invention relates to a disk drive that utilizes novel techniques for storing, retrieving, and using servo data. The invention recognizes that the data traditionally stored in servo spokes is of two basic types. A first type, referred to herein as VIPL data for "value is physical location", includes overhead data for which the information content is tied to the physical location of the data on the disk. A servo burst represents VIPL data, for example, because the indication produced by reading the burst, and thus the information derived from the burst, depends upon the positional relationship between the transducer and the burst at the time of the reading. A second type of data, known as non-VIPL data, includes overhead data for which the information content is not tied to the physical location of the data on the disk. That is, the data does not need to be located at the position on the disk to which it applies. Embedded runout correction (ERC) data is an example of non-VIPL data because the information derived from reading the ERC data (i.e., runout values corresponding to particular locations on the disk) does not depend on the position of the data at the time of the reading.

In accordance with the present invention, some or all of the non-VIPL data normally stored within the servo spokes of the disk is moved into a series of "servo in data" or SID sectors within the customer data regions of the disk. The SID sectors on the disk are similar to customer data sectors in that they can have a preamble field, a synchronization field, a payload area, and error detection/correction information. The SID sectors, however, do not have to have the same size as the customer data sectors. In one embodiment, for example, the SID sectors are each significantly smaller than a customer data sector. The SID sectors within a particular zone of the disk are all preferably located a fixed interval of time from a nearest preceding servo spoke on the disk. This allows the SID sectors to be easily located during disk operations. In addition, the SID sectors on a disk can be of different sizes from one another and can be unevenly spaced about the disk.

The SID sectors are read using the same standard channel hardware that is used to read the customer data sectors. However, in one embodiment of the invention, the SID sectors on a target track are read earlier in the seek/settle/track follow sequence than are the customer data sectors. This technique reduces the average latency involved with retrieving the SID data from the disk. In addition, the SID sectors on a disk can store data redundantly on the disk (i.e., the same data in more than one SID sector) to enhance system reliability.

In a preferred embodiment of the invention, each track of a data storage disk includes a plurality of SID sectors that are each located within a separate customer data region of the track. The number of SID sectors on the track, however, is less then the number of servo spokes on the track. Each SID sector on the track includes non-VIPL data corresponding to multiple servo sectors on the track. For example, in one approach, embedded runout correction (ERC) data for multiple servo sectors on the track is stored within each SID sector. During a data transfer operation, while the transducer is track following on the track, one of the SID sectors is read by the transducer and the resulting ERC data is stored within a semiconductor memory in the disk drive. The stored ERC data is then retrieved as needed as the transducer traverses subsequent servo sectors on the disk surface to perform appropriate servo correction operations. When a subsequent SID sector is traversed by the transducer, new ERC data is stored in the semiconductor memory and the process is repeated.

Moving non-VIPL data into the SID sectors provides many advantages over prior servo data schemes. For example, one advantage is a significant reduction in the amount of data that needs to be written by the STW during disk drive manufacture. This decrease in STW use during manufacture can reduce the time and expense of disk drive fabrication considerably. Another benefit relates to the fact that the SID sectors are written by the transducer within the disk drive and thus can be rewritten at any time. This allows periodic re-calibrations to be done on the SID data, which can significantly improve overall transducer positioning performance. For example, ERC values stored in the SID sectors can be periodically re-measured and rewritten during the life of the disk drive. As disk densities increase, this "tracking" of spindle runout changes with time can be very valuable to servo positioning accuracy.

Another advantage of the SID concept is that it allows a greater level of error detection/correction to be used to protect the non-VIPL data within the SID sector than has traditionally been available within the servo spokes. This increased error handling functionality can greatly improve servo reliability. A further advantage relates to the fact that data in the servo spokes of the disk are normally stored at lower frequencies than the customer data, thereby utilizing more disk area to store a given amount of data. By moving the non-VIPL data to the customer data regions, the same amount of data can now be stored in a smaller amount of disk space. In yet another advantage, the non-VIPL data from multiple servo spokes can be grouped together in a single SID sector on a track so that it is all read, processed, and stored in a RAM memory at the same time. The data is then available a priori when the corresponding servo spokes are traversed by the transducer. Many other advantages of the inventive principles will become apparent in light of the following description of a preferred embodiment.

DETAILED DESCRIPTION OF A PREFERRED EMBODIMENT

The present invention relates to a disk drive that utilizes novel techniques for storing, retrieving, and using servo data. The disk drive uses a series of "servo in data" or SID sectors within the customer data regions of the disk(s) to store overhead data for which the information content is not tied to the physical location of the data on the disk. Thus, the servo spokes of the disk can be made appreciably shorter (quicker in time) because the data within the SID sectors are written at the higher customer data frequencies rather than the lower overhead data frequency used within the servo spokes, and thus occupy a smaller area on the disk surface, a reduction in the overall amount of disk space occupied by the non-VIPL data can be achieved. Like ordinary customer data, the SID data within the SID sectors can be repeatedly rewritten by the customer after purchase. In addition, the SID data can be protected by a higher level of error detection/correction than is normally available in the servo spokes, although the high levels used for protecting customer data do not have to be implemented in the SID sectors. The inventive principles also allow a significant portion of the data detection functionality to be moved from the channel to the controller chip of the disk drive, thus giving the disk drive manufacturer greater control over the design process. In addition, the inventive techniques allow a disk drive designer to trade overhead space for data latency in a predictable manner.

Figure 1:
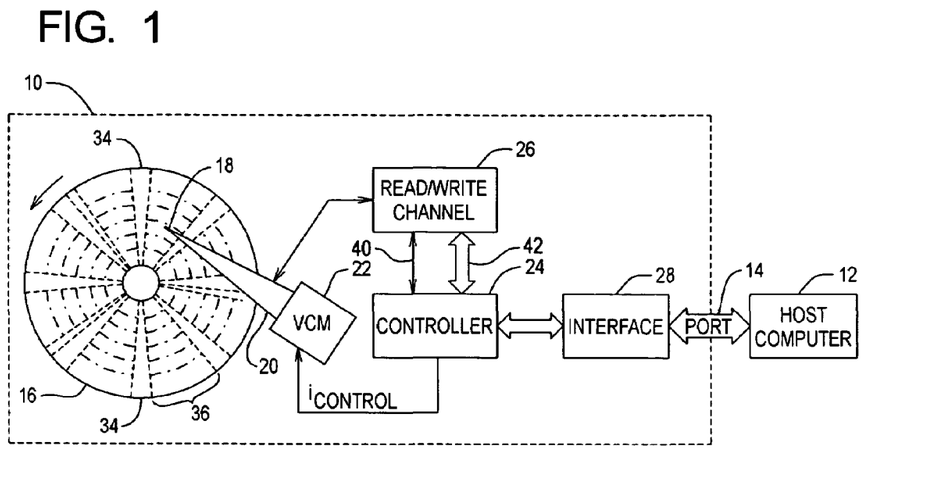
FIG. 1 is a block diagram illustrating a disk drive that can utilize the principles of the present invention.

FIG. 1 illustrates a disk drive 10 that can utilize the principles of the present invention. In the discussion that follows, the basic operation of the disk drive 10 will be described before a description of the invention is undertaken. As illustrated, the disk drive 10 is coupled, via input/output port 14, to an external host computer 12 which uses the disk drive 10 as a data storage device. The host 12 delivers data access requests to the disk drive 10 via port 14. In addition, port 14 is used to transfer customer data between the disk drive 10 and the host 12 during read and write operations. The disk drive 10 includes: a disk 16, a transducer 18, an actuator arm 20, a voice coil motor (VCM) 22, a controller 24, a read/write channel 26, and an interface 28. The disk 16 is a data storage medium that stores data in substantially concentric data storage tracks on a surface of the medium. In a magnetic disk drive, for example, the data is stored in the form of magnetic polarity transitions within each track. Data is "read" from the disk 16 by positioning the transducer 18 above a desired track of the disk 16 and sensing the data stored within the track as the track moves below the transducer 18. Similarly, data is "written" to the disk 16 by positioning the transducer 18 above a desired track and delivering a write current representative of the desired data to the transducer 18 at an appropriate time.

The actuator arm 20 is a semi-rigid member that acts as a support structure for the transducer 18, holding it above the surface of the disk 16. The actuator arm 20 is coupled at one end to the transducer 18 and at another end to the VCM 22. The VCM 22 is operative for imparting controlled motion to the actuator arm 20 to appropriately position the transducer 18 with respect to the disk 16. The VCM 22 operates in response to a control signal $i_{control}$ generated by the controller 24. The controller 24 generates the control signal $i_{control}$ in response to an access command received from the host 12 via the interface 28.

The read/write channel 26 is operative for appropriately processing the data being read from/written to the disk 16. For example, during a read operation, the read/write channel 26 converts an analog read signal generated by the transducer 18 into a digital data signal that can be recognized by the controller 24. The channel 26 is also generally capable of recovering timing information from the analog read signal. During a write operation, the read/write channel 26 converts customer data received from the host 12 into a write current signal that is delivered to the transducer 18 to "write" the customer data to an appropriate portion of the disk 18. As will be discussed in greater detail, the read/write channel 26 is also operative for continually processing data read from servo spokes on the disk 16 and delivering the processed data to the controller 24 for use in, for example, transducer positioning.

Figure 2:
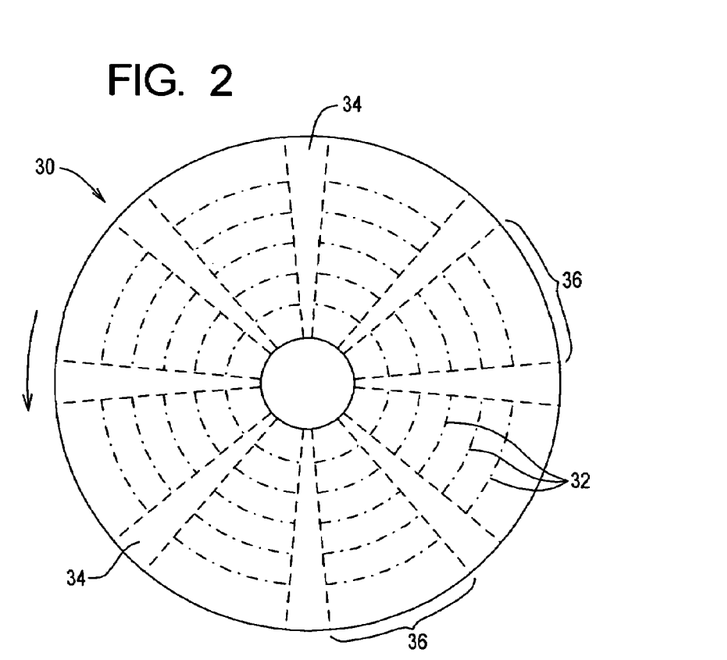
FIG. 2 is a top view of a data storage disk illustrating a typical data storage configuration.

FIG. 2 is a top view of a magnetic storage disk 30 illustrating a typical organization of data on the surface of the disk 30. As shown, the disk 30 includes a plurality of concentric data storage tracks 32 for use in storing data on the disk 30. The data storage tracks 32 are illustrated as center lines on the surface of the disk 30; however, it should be understood that the actual tracks will each occupy a finite width about a corresponding centerline. The data storage disk 30 also includes a plurality of radially aligned servo spokes 34 that each cross all of the tracks 32 on the disk 30. The servo spokes 34 each include servo information that is read by the transducer 18 during disk drive operation for use in positioning the transducer 18 above a desired track of the disk 30. The track portions between servo spokes 34 have traditionally been used to store customer data received from, for example, the host computer 12 and are thus referred to herein as customer data regions 36. The customer data regions 36 on a track are normally subdivided into fixed length data units referred to herein as customer data sectors (not shown in FIG. 1). In addition to the above, the magnetic storage disk 30 may include a plurality of recording "zones" that each store customer data at a different recording frequency. This zoned approach takes advantage of the longer physical length of the outer tracks of the disk to store a larger amount of customer data. It should be understood that the number of tracks 32 and servo spokes 34 shown on the surface of the disk 30 of FIG. 2 have been made relatively low for illustration purposes. That is, modern disk drives normally use data storage disks having a considerably larger number of tracks and servo spokes.

The data within the servo spokes 34 of a disk 30 are normally written during disk drive manufacture by a special piece of equipment known as a servo track writer (STW). A STW is a very precise piece of equipment that is capable of writing data on the disk surface with a high degree of positional accuracy. In general, a STW is a very expensive piece of capital equipment. Thus, it is generally desirable that a STW be used as efficiently as possible during manufacturing operations. Even a small reduction in the amount of data needed to be written by the STW per disk can result in a significant cost and time savings.

Once a disk drive has been sealed during manufacture, the overhead data in the servo spokes 34 of the disks within the drive is never rewritten. That is, the overhead data is stored in a "read only" state within the servo spokes. Conversely, the customer data stored within the customer data regions 36 can be written and repeatedly rewritten by the customer. The data within the customer data regions 36 of a track are generally stored at a higher frequency than the data stored within the servo spokes 34 of the same track and thus more data can be stored in a given amount of disk area in the customer data regions 36. In addition, in disk drives implementing constant linear density (CLD) or zoned arrangements, the data frequency in the customer data regions 36 increases with radial distance over the disk surface while the data frequency within the servo spokes remains the same over the surface of the disk 30.

As described above, the read/write channel 26 of the disk drive 10 processes data read from the servo spokes 34 of the disk 16 differently from data read from the customer data regions 36 of the disk. For example, with reference to FIG. 1, the data read from the servo spokes 34 is delivered to the controller 24 via a serial data line 40 while data read from the customer data regions 36 are delivered to the controller 24 over the faster parallel data line 42. Customer data received by the controller 24 on parallel line 42 during a read operation is usually directly transferred to the host 12, in parallel form, via interface unit 28. The servo data received by the controller 24 via serial line 40 is used within the controller 24 to, among other things, develop the control signal $i_{control}$ for delivery to the VCM 22 to control transducer positioning.

In conceiving of the present invention, it was appreciated that some overhead data stored on the disk 16 (referred to herein as "VIPL" data for "value is physical location") communicates information to the controller 24 based on the precise physical location of the data read by the transducer 18 while other overhead data on the disk 16 (referred to herein as "non-VIPL" data) communicates literal information to the controller 24 that does not need to be stored at the location of the servo spoke on the disk that it applies to. It was thus determined that significant advantages could be achieved if the amount of non-VIPL data stored within the servo spokes of the disk (i.e., the data written by the STW) was reduced. In accordance with the present invention, therefore, some or all of the non-VIPL data traditionally stored within the servo spokes of the disk is moved to dedicated areas within the customer data regions 36 of the disk 16.

Transferring non-VIPL data to the customer data regions 36 of the disk 16 provides many advantages. One advantage is that the amount of data that needs to be written by the STW is significantly reduced. As described above, STW time is a very costly commodity and any reduction in STW usage during disk drive assembly will reduce disk drive manufacturing costs and assembly times. Another advantage is that the non-VIPL data written in the customer data regions is capable of being rewritten in the field by the user. This ability can be valuable, for example, should the data be accidently corrupted during disk drive operation. The ability to rewrite the data can also be used to implement periodic recalibration of certain non-VIPL information (e.g., runout data) during the life of the disk drive.

A third benefit of moving non-VIPL data to the customer data regions 36 of the disk 16 is that data that has historically been exclusively processed within the read/write channel 26 can now be processed at least partially within the controller 24 of the disk drive. As is well known in the disk drive industry, disk drive manufacturers normally contract channel design tasks out to companies that specialize in the design of disk drive channel chips. Disk drive controllers, on the other hand, are normally developed in-house by the disk drive manufacturers. By moving non-VIPL data into the customer data regions of the disk, a larger amount of data can now be processed within the controller 24 of the drive, thus giving the disk drive manufacturer more control over the design process and reducing product cycle times. For example, a single repetitive runout correction solution can be implemented in the controller 24 rather than having multiple channel vendors develop independent runout solutions within the channel chips. In addition, servo enhancements and additions can be accomplished without requiring an expensive channel redesign by the vendor.

A further advantage comes from the fact that data in the servo spokes of the disk are normally stored at lower frequencies, thereby utilizing more disk area to store a given amount of data. By moving non-VIPL data to the customer data regions, a given amount of data can be stored using a smaller amount of disk space and using standard customer data recording technologies. In yet another advantage, the non-VIPL data from multiple servo sectors can be grouped together in a single SID sector on a track so that they are all read and stored in a RAM memory at the same time. The data is then available a priori when the corresponding servo sectors are traversed by the transducer 18. As will be apparent from the discussion that follows, the principles of the present invention also provide many other benefits and advantages.

Figure 3:
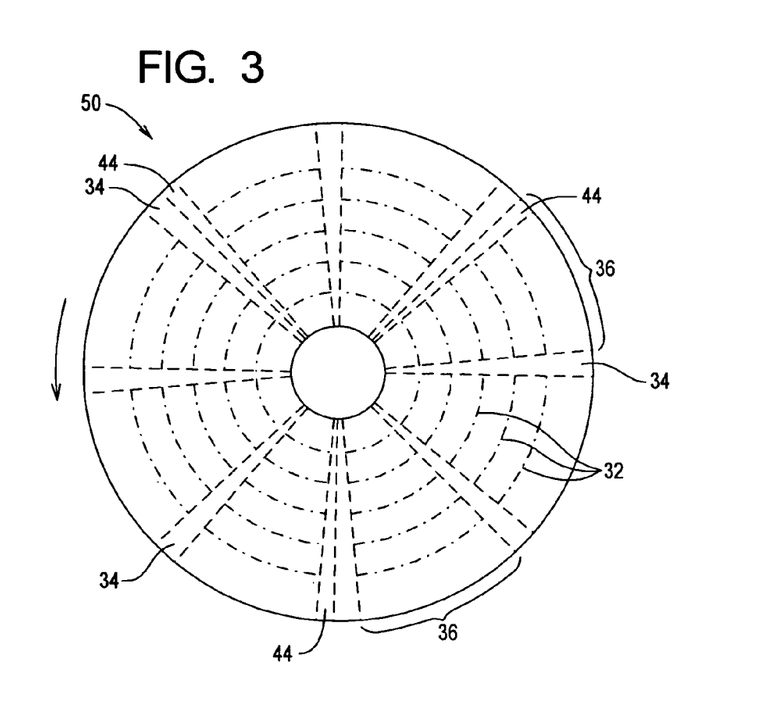
FIG. 3 is a top view of a data storage disk illustrating a data storage configuration in accordance with one embodiment of the present invention.

FIG. 3 is a top view of a magnetic storage disk 50 illustrating an organization of data on the surface of the disk 50 in accordance with one embodiment of the present invention. As with the disk 30 of FIG. 2, the disk 50 includes a plurality of concentric data storage tracks 32, a plurality of radially aligned servo spokes 34, and a plurality of customer data regions 36. The disk 50 may also utilize a CLD or zoned approach for storing customer data. However, unlike the previously described disk 30, the disk 50 of FIG. 3 also includes a plurality of "Servo In Data" (SID) sectors 44 in the customer data regions 36 that are used to store non-VIPL data that was formally located within the servo spokes 34. Because non-VIPL data was moved out of the servo spokes 34 and into the SID sectors 44, the servo spokes 34 can be made narrower (shorter in time), thus occupying less area on the surface of the disk 50. In addition, because the data in the customer data regions 36 is written at a higher frequency than the data in the servo spokes 44, less disk area is used to write the non-VIPL data in the SID sectors 44 than was used previously to write the data in the servo spokes 44. For reasons that will soon become apparent, the number of SID sectors 44 on a track 32 is preferably less than the number of servo spokes 34 on the track.

Figure 4:
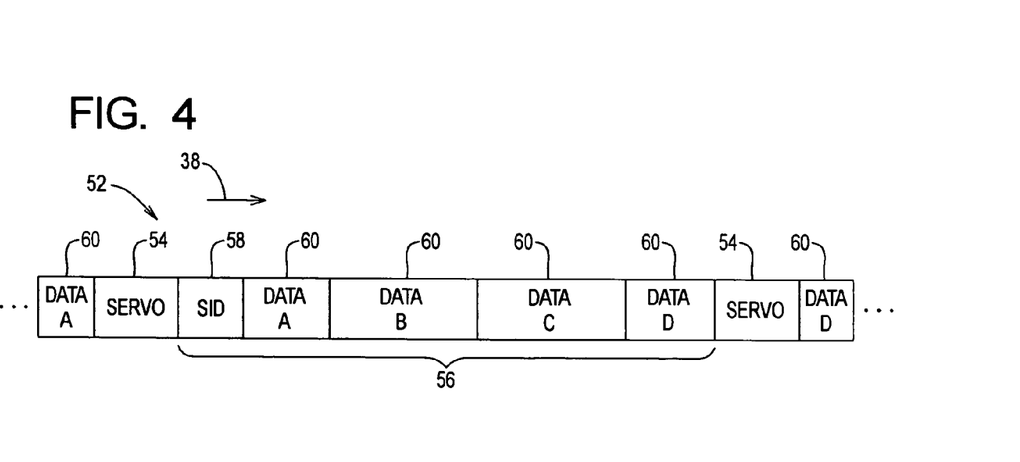
FIG. 4 is a diagram illustrating a data storage configuration within a data storage track in accordance with one embodiment of the present invention.

FIG. 4 is a diagram illustrating a portion of a data track 52 from a disk utilizing SID-based storage techniques (e.g., disk 50 of FIG. 3). As illustrated, the track 52 includes multiple servo sectors 54 and a customer data region 56 between each successive pair of servo sectors 54. Each customer data region 56 includes at least a portion of a customer data sector 60. As illustrated, each customer data sector 60 can be an uninterrupted sector (such as customer data sectors B and C) or a split data sector (such as customer data sectors A and D). Selected customer data regions 56 on the track 52 also include a SID sector 58 for storing non-VIPL overhead data corresponding to at least one (and preferably more) of the servo sectors 54 on the track 52. As described above, in a preferred embodiment, less than all of the customer data regions 56 on the track 52 include a SID sector 58.

In one embodiment of the invention, the SID sectors on a track are each positioned a fixed time period (with respect to disk rotation) from a previous servo sector mark on the same track so that the SID sectors can be easily located during disk drive operations. For example, with reference to FIG. 4, the SID sector 58 is positioned immediately after (in the direction of relative transducer movement 38) a corresponding servo sector 54. Thus, all SID sectors 58 on the track 52 would occur immediately after a nearest servo sector (as in disk 50 of FIG. 3). Preferably, all of the SID sectors on the entire disk will be located the same fixed time period from a preceding servo sector mark; however, in a zoned system, the fixed time periods may change from zone to zone. Virtually any fixed time period can be used in accordance with the present invention, as long as the corresponding SID sector 58 will fit fully within the subsequent customer data region 56. That is, the SID sectors 58 can be placed at the beginning, the end, or at some intermediate position within the customer data region 56.

In an alternative embodiment, the SID sectors are placed within the format holes between customer data sectors on each track. In this case, a more complex SID sector location algorithm needs to be implemented to find the SID sectors within a particular track during disk drive operations. In one approach, for example, a semiconductor lookup table is implemented for locating the format holes on a particular track during read and/or write operations. As will be apparent to a person of ordinary skill in the art, other methods for tracking the location of the format holes also exist.

As described above, in a preferred embodiment of the invention, the number of SID sectors on a track of a disk is less than the number of servo sectors on the track. For example, with reference to FIG. 4, a SID sector 58 occurs after one servo sector 54 on the track 52 but not after a subsequent servo sector 54. In such an arrangement, the SID sector 58 preferably carries non-VIPL data corresponding to all of the servo sectors 54 between the SID sector 58 and a next SID sector 58 on the track 52 (in the direction of relative transducer movement 38). During disk drive operation, while the transducer 18 is track following on the track 52, the transducer 18 reads the SID sector 58 and the controller 24 causes the resulting SID data to be temporarily stored in a semiconductor buffer memory. The controller 24 then retrieves appropriate portions of the SID data from the buffer memory for processing as the transducer 18 traverses each of the subsequent servo sectors 54 on the track 52 until the next SID sector 58 is reached. Because the SID data has already been processed by the read/write channel 26 before it is stored in the buffer memory and is readily available in the memory in the proper format before each of the subsequent servo sectors 54 are reached by the transducer 18, servo processing for the subsequent servo sectors 54 is performed much more rapidly than in systems of the past that stored the data within the associated servo sector. In addition, because each of the SID sectors 58 on the disk requires a minimal amount of overhead to enable the transducer to accurately read the data within the sector 58 (e.g., preamble and synchronization fields), storing non-VIPL data corresponding to multiple servo spokes 54 into a single SID sector 58 makes efficient use of the overhead data.

As illustrated in FIG. 3, the SID sectors 44 can be unequally spaced about the disk 50. That is, the distance between adjacent SID sectors 44 does not have to be uniform about the disk 50. Likewise, the SID sectors 58 on a track do not all have to include the same amount of data. Unequal SID sector spacing/size may be desired, for example, so that the logical data sectors properly align with the physical data sectors on the track.

In general, the disk drive controller 24 should always be able to determine the location of the next SID sector 58 on a track so that it knows when to store the corresponding SID data in the buffer memory. In a system using equally spaced SID sectors 58, the task is relatively simple because the controller 24 just needs to remember the fixed number of servo sectors 54 between successive SID sectors 58. A counter can then be used to count servo sectors 54 to find a subsequent SID sector 58. If unequally spaced SID sectors are used, however, SID sector location can be more complicated. In one embodiment of the invention, each SID sector 58 includes a field indicating the distance from the present SID sector to a subsequent SID sector on the track 52. This field can include, for example, a digital value specifying the number of servo sectors between the present SID sector and the subsequent SID sector. In a system where only one SID sector spacing per track is different from the others, a simple flag bit can be used to identify the SID sector preceding the unequal interval. When the controller 24 detects the flag bit, it knows to use a different counter value to locate the subsequent SID sector. Other methods for tracking SID locations are also possible.

In one embodiment of the invention, the SID sectors 58 on each track 52 of a data storage disk include redundant data. That is, multiple SID sectors 58 within a track 52 each have duplicate non-VIPL overhead data corresponding to a particular servo sector on the track. In one approach, for example, data from each servo sector on a track is stored in at least two different SID sectors on the track. In another approach, each SID sector on a track includes servo data from every servo sector on the same track so that the controller 24 has access to data for every servo sector on the track after reading a single SID sector. By providing data redundancy, the chances that non-VIPL data for a particular servo sector will be irretrievably lost is significantly reduced. For example, if data corresponding to a particular servo sector is lost from one SID sector on a track, the data can be easily retrieved from another SID sector on the same track and rewritten into the first SID sector.

Another advantage of the SID concept is that it allows a greater level of error detection/correction to be used to protect the non-VIPL data within the SID sector than is traditionally used within a servo sector. Servo sectors, for example, generally use a minimal "parity" approach to error detection. The SID sector, on the other hand, can utilize a more powerful error detection/correction technique, such as those typically used in customer data sectors. In one embodiment of the invention, the level of error detection/correction that is used within the SID sectors is less than that used in the customer data sectors (to reduce overhead) but considerably more than that used in the servo spokes (i.e., a parity bit). For example, if overhead is an overriding concern, a minimal cyclic redundancy check (CRC) approach can be implemented in the SID sectors. If greater error protection is required, a scaled back error correctional code (ECC) can be used.

In accordance with the present invention, virtually any form of non-VIPL overhead data that is traditionally associated with the servo spokes of a disk drive can be stored within the SID sectors of the disk. This can include, for example, embedded runout correction (ERC) data, servo sector identification data, reliability information, development debug information, and diagnostic information. In addition, data corresponding to the overall track, such as average runout and servo defect management information, can also be stored in the SID sectors. A SID sector data configuration is preferably defined that allows the controller 24 to easily determine which data read from a SID sector corresponds with a particular servo sector on the track. In one embodiment, for example, the controller 24 knows the precise number of data bytes within a SID sector that correspond to each servo sector on the track. Thus, a first block of bytes of that size are used in connection with a first subsequent servo sector, a second block of bytes of that size with a next subsequent servo sector, and so on. In another approach, servo sector addresses are associated with the SID data to facilitate proper application of the data. Other techniques for matching SID data to corresponding servo sectors also exist.

In one aspect of the invention, a considerable reduction in overhead is achieved by eliminating from the disk some or all of the data in the servo sector that has traditionally been used to facilitate accurate retrieval of servo information from the servo sectors. For example, servo sectors of the past have generally included fields such as a preamble field, a synchronization (sync) field, a spin tolerance field, a parity field, and a data closure field to help the disk drive accurately read the payload data within the servo sector. Because there was a considerable amount of payload data within each servo sector, the likelihood of read errors was relatively high and the additional overhead was deemed necessary for proper data retrieval. However, because the amount of payload data within the servo sectors can be reduced dramatically using the principles of the present invention, the amount of overhead data required to accurately reproduce the payload data can be reduced accordingly. In one embodiment of the invention, for example, the servo sector payloads include only a shortened track address (Gray code) and the ABCD servo bursts. In such an embodiment, only a minimal amount of overhead is needed to ensure accurate servo sector reproduction. The SID contains the full track address and corrections for fine position bursts.

Referring back to FIG. 1, a significant benefit of the present invention is that the non-VIPL data stored in the SID sectors are treated like ordinary customer data by the read/write channel 26. Thus, after the data is detected, it is transferred to the controller 24 via parallel data line 42, using the standard handshake, rather than over the slower serial data line 40. The controller 24 thereafter stores the data in a buffer memory for later use. Because a SID sector is generally a different length than a customer data sector, a special counter for bytes transferred and an address pointer to the buffer memory is normally required. The buffer memory can include a dedicated semiconductor memory element or a portion of an existing buffer space can be used. The size of the buffer space depends upon the SID data and servo algorithms.

In one embodiment of the present invention, the SID sectors are used to store embedded runout correction (ERC) values. Each SID sector includes a predetermined number of ERC values corresponding to an equal number of subsequent servo sectors on the same track. The controller 24 reads the ERC values from the SID sector and stores the values within a buffer memory. Then, as each subsequent servo sector approaches, the controller 24 retrieves a corresponding ERC value from the buffer and uses it to generate the control signal $i_{control}$ that is delivered to the VCM 22.

Figure 5:
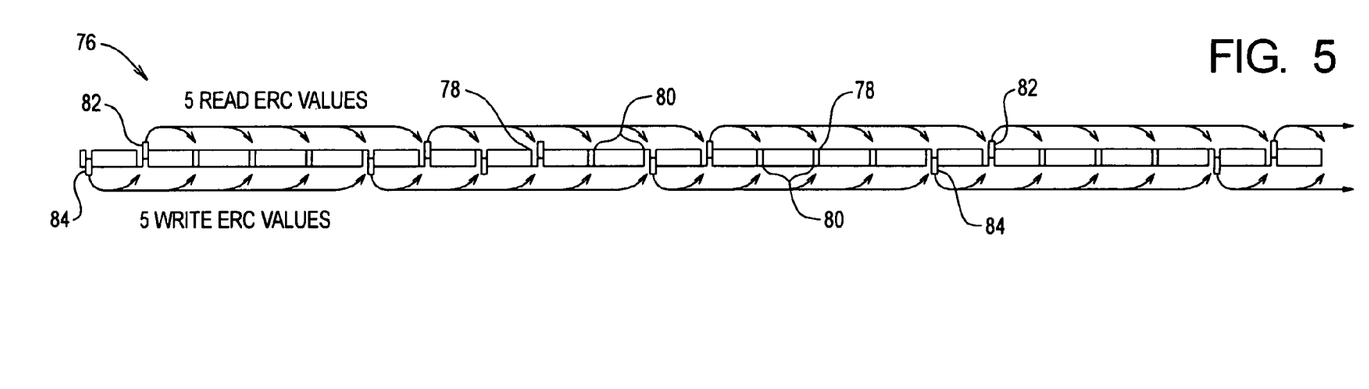
FIG. 5 is a diagram illustrating a data storage configuration within a data storage track in accordance with another embodiment of the present invention.

FIG. 5 illustrates a SID configuration that is used on a track 76 in one embodiment of the invention. As shown, the track 76 includes a plurality of servo sectors 78 and a plurality of customer data regions 80 that are each located between two adjacent servo sectors 78. The track 76 also includes a plurality of read SID sectors 82 having ERC values for use during read operations and a plurality of write SID sectors 84 having ERC values for use during write operations. Each of the read and write SID sectors 82, 84 includes 5 ERC values corresponding to 5 subsequent servo sectors on the track 76 (although the number of values can vary). In addition, the read and write SID sectors 82, 84 alternate on the track 76. As illustrated in FIG. 5, if a dual element transducer having a lateral offset between the read and write element is used, the read and\or write SID sectors 82, 84 can be offset from the track centerline to compensate for the offset between the elements (i.e., by the read and write microjog values, respectively).

In one embodiment of the present invention, SID data corresponding to servo sectors on one track is stored within one or more SID sectors on another track for use during multi-track sequential read and/or write operations. In a conventional read or write operation, a single block of customer data is transferred from/to a single identified customer data sector on a disk surface. In a sequential read or write operation, on the other hand, multiple customer data blocks are transferred from/to the disk(s) in a disk drive in a single operation. The multiple customer data blocks are read from or written to a plurality of sequentially located customer data sectors on the surface(s) of the disk(s) using a predetermined sequential pattern that is specific to the particular disk drive.

In a typical sequential read operation, for example, a host computer will request that the disk drive read a predetermined number of customer data sectors starting at a specific logical block address (LBA) in the disk drive. The disk drive then moves a corresponding transducer to a customer data sector corresponding to the specified LBA and reads the requested number of data sectors from that point on by following the predetermined sequential pattern of the locations on the disk drive specified by surface number and track number on a surface and sector number on a track. In one possible pattern, for example, the disk drive will read successive customer data sectors within the track of the specified LBA until a last data sector in the track is reached after which it moves to a next track on the same disk surface and then a next track until a last track on that disk surface is reached. The disk drive will then switch to a track on a next disk surface that is within the same cylinder as the last track on the first disk surface and the sequential read will continue backwards through the tracks on the new disk surface, and so on. In another possible pattern, the disk drive will read successive customer data sectors within the track of the specified LBA until a last sector is reached and will then switch to another track within the same cylinder as the present track but on a next disk surface. The disk drive will then switch from track to track within the cylinder until a last disk surface has been reached, after which the disk drive changes to a new track on the last disk surface and moves back through the disk surfaces in the new cylinder.

Naturally, the disk drive will only follow the predetermined pattern as far as necessary to complete the requested operation, regardless of the particular sequential pattern used. Thus, a particular sequential operation may involve a single track, multiple tracks on a single disk surface, or multiple tracks on multiple disk surfaces. As can be appreciated, a large number of different sequential patterns are possible. The sequential pattern that is used in a particular disk drive is generally determined during disk drive design and is normally transparent to the host.

As described above, in accordance with one embodiment of the invention, SID information for a "next track" in a multi-track sequential disk operation is stored within a present track. Thus, the SID information is read and available for use before the transducer reaches the next track in the sequential pattern (or, in a case where the next track is on another disk, before control is switched to a different transducer). By having the SID data buffered and ready for use a priori, servo data processing on the new track is accelerated and problems relating to transducer latency are avoided. This technique can significantly increase the speed and accuracy of sequential read and write operations and can be used regardless of the specific sequential pattern that is implemented within the disk drive.

Figure 6:
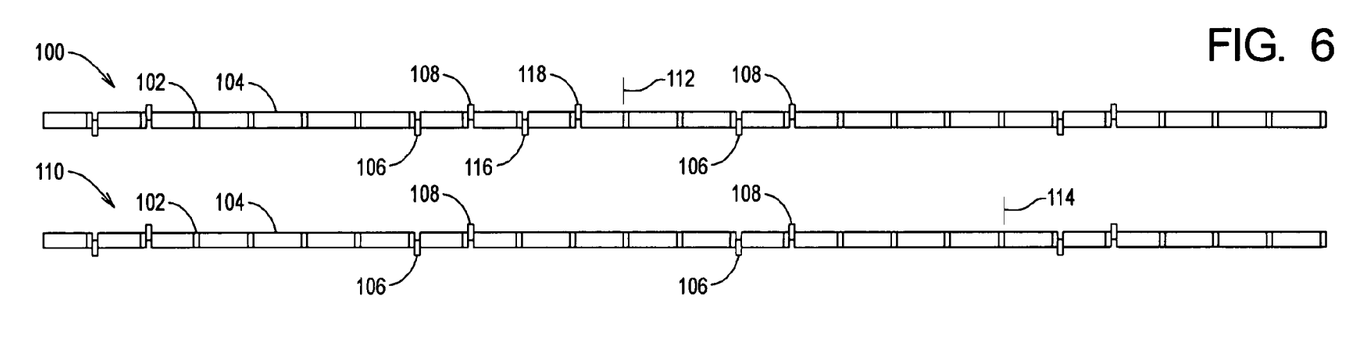
FIG. 6 is a diagram illustrating two successive tracks used in a sequential data transfer operation in accordance with one embodiment of the present invention.

FIG. 6 is a diagram illustrating a pair of tracks 100, 110 that can be used during sequential read and write operations in a disk drive in accordance with the present invention. For purposes of convenience, all further discussion will be with respect to sequential read operations, although the concepts are equally applicable to sequential write operations. As shown, each of the tracks 100, 110 includes a plurality of servo sectors 102 and a plurality of customer data regions 104. As discussed previously, the customer data regions 104 each include at least a portion of a customer data sector (not shown in FIG. 6). In addition, as described previously, each track 100, 110 includes a plurality of write SID sectors 106 and a plurality of read SID sectors 108 that each include SID data corresponding to the tracks on which the sectors 106, 108 are located.

During a sequential read operation, for example, the disk drive sequentially reads the customer data sectors on the present track 100 until the end 112 of a last customer data sector on the present track 100 is reached. The disk drive then positions to the next track 110 and begins to read customer data sectors on the next track 110 at a point 114 where a first customer data sector on the next track 110 begins. As is customary in sequential disk operations, a skewed track arrangement is implemented in the disk drive where the first customer data sector (e.g., the sector starting at point 114 on track 110) on each track is offset from (i.e., not radially aligned with) those on the other tracks of the disk(s). This skewing is used so that a reduced amount of latency is experienced when switching from one track to the next during a sequential operation (whether or not the next track is located on the same or different disk surface). That is, a minimal distance is allowed for the transducer to reliably seek to and settle on the next track 110 before the first customer data sector on the new track 110 is reached.

As illustrated, for this embodiment, a pair of "next track" SID sectors 116, 118 are located within the present track 100 that each include SID data corresponding to servo sectors 102 in the next track 110. Thus, during a sequential read operation, for example, the disk drive reads and stores the SID data located in the read "next track" SID sector 108 on the present track 100 before switching to the next track 110. Thus, after the switch is made, the data is already available in a memory for use in performing servo functions on the next track 110. Therefore, the disk drive is able to perform, for example, ERC corrections at the servo sectors on the next track 110 without having read a corresponding SID sector 108 on the next track 110 (which might have required an entire revolution of the disk). As can be appreciated, this can significantly increase transducer positioning accuracy on the next track 110 before the starting point 114 of the first customer data sector thereon is reached and may allow the skew distance to be reduced.

In a preferred approach, the "next track" SID sectors 116, 118 are located in the SID sector positions immediately preceding the last customer data sector on the track. If these SID sector positions are already taken by "same track" SID sectors 106, 108, than the SID sector positions preceding the "same track" SID sectors 106, 108 will preferably be used for the "next track" SID sectors. Each track in the disk drive will generally include at least one "next track" SID sector for the next track in the sequential pattern, regardless of whether the next track is located on the same or a different disk surface. In one approach, the "next track" SID sector includes SID data corresponding to the entire next track, although "next track" SID sectors including partial next track information can also be implemented in accordance with the present invention. For example, the "next track" SID sectors may only include data for a transition region on the next track 110 during which the transducer is seeking to and settling on the next track.

In one embodiment, identification information (e.g. a flag bit) is stored in the SID sectors to identify whether they are for the present track or for the next track. Alternatively, or in addition, information may be provided in each SID sector identifying whether the next SID sector on the same track is for the present track or for the next track. As described above, each SID sector can also indicate the distance to the next SID sector on the same track.

Figure 7:
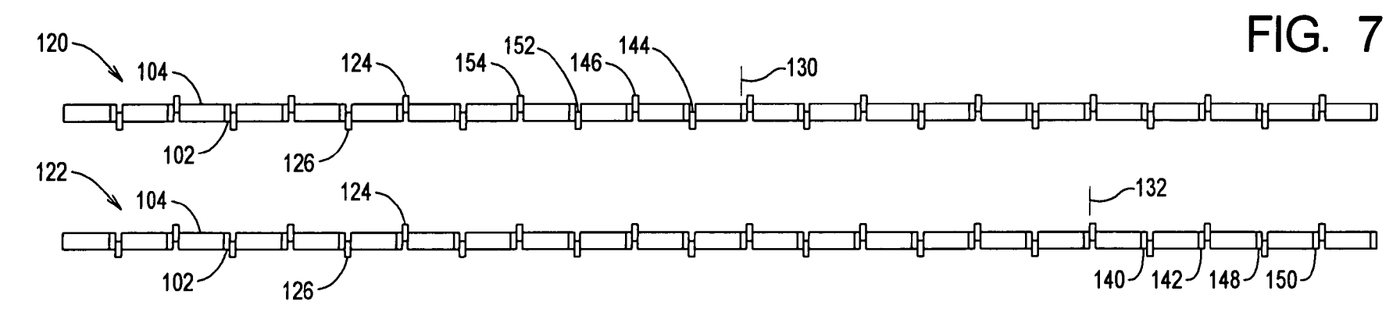
FIG. 7 is a diagram illustrating two successive tracks used in a sequential data transfer operation in accordance with another embodiment of the present invention.

In some cases, it will be desirable to distribute "next track" SID data over multiple SID data sectors on a present track. For example, in a situation where all of the possible SID sector locations on a present track are occupied by "same track" SID sectors, it will generally be desirable to spread out the "next track" SID data over some or all of the present track SID sectors. FIG. 7 is a diagram illustrating a pair of successive tracks 120, 122 for use in a sequential disk operation that each include same track read SID sectors 124 and same track write SID sectors 126 that each have a span of two servo spokes. Thus, every possible SID sector location on the two tracks 120, 122 includes a "same track" SID sector 124, 126. In this embodiment, the "next track" SID data is distributed among the "same track" SID sectors 124, 126 on the present track 120. In addition, because a sequential disk operation might be initiated with a partial track read or write on the present track 120, the next track SID data is stored in the "same track" SID sectors 124, 126 on the present track 120 in reverse order. That is, values for the first servo sectors 140, 142 after the start point 132 on the next track 122 are stored in the last SID sectors 144, 146 on the present track 120. Values for the next servo sectors 148, 150 on the next track 122 are stored in the next to last SID sectors 152, 154 on the present track 120, and so on. Preferably, the next track SID data stored on the present track 120 will include identification information identifying the corresponding servo sectors on the next track 122.

The principles of the present invention can be applied in disk drives using virtually any form of servoing arrangement. For example, the invention can be used in drives utilizing a constant linear density (CLD) scheme, a zoned arrangement, split data sectors, constant data frequency systems, and even systems that use STW written servo sectors that are not radially aligned (i.e., not arranged in spokes). In addition, the SID sectors of the present invention can also be used to store data that was not traditionally stored in the servo spokes because of concerns about increased overhead. Furthermore, the principles of the invention can be extended to provide an additional reduction in overhead by further concentrating the SID data, such as by utilizing a single SID sector per track, a single SID sector per group of tracks (e.g., per zone), or a single SID sector per disk surface.

Although the present invention has been described in conjunction with its preferred embodiments, it is to be understood that modifications and variations may be resorted to without departing from the spirit and scope of the invention as those skilled in the art readily understand. For example, the SID sectors of the present invention do not have to radially aligned into a "spoke" arrangement as shown in the illustrated embodiment. Such modifications and variations are considered to be within the purview and scope of the invention and the appended claims.

What is claimed is:

1. A disk drive comprising:
a data storage disk having a plurality of substantially concentric tracks, each of said tracks having a plurality of servo sectors and a plurality of customer data regions distributed therein, said plurality of servo sectors including data that is recorded at a first frequency and a plurality of customer data regions including data that is recorded at a second frequency different from said first frequency, wherein at least one of said customer data regions on said data storage disk includes a dedicated portion for storing overhead data corresponding to multiple servo sectors on said data storage disk, said overhead data being recorded at said second frequency and including servo sector identification information; and
a controller which receives said overhead data after it has been read by a transducer, stores said overhead data in a buffer memory, and subsequently uses a portion of said overhead data stored in said buffer memory in response to traversal of one of said multiple servo sectors on said disk by said transducer to enhance disk drive performance.

2. The disk drive, as claimed in claim 1, wherein:
said data that is recorded at a first frequency within said plurality of servo sectors is written using a servo track writer during disk drive manufacture.

3. The disk drive, as claimed in claim 1, wherein:
said data that is recorded at a second frequency is written using said transducer.

4. The disk drive, as claimed in claim 1, wherein:
said controller is operative for generating a control signal that is input to a motor unit coupled to the transducer, wherein said controller uses said portion of said overhead data to modify said control signal in response to traversal of said one of said multiple servo sectors by said transducer.

5. The disk drive, as claimed in claim 1, wherein:
said overhead data further includes embedded run out correction (ERC) data.

6. The disk drive, as claimed in claim 1, wherein:
said overhead data further includes disk drive data reliability information.

7. The disk drive, as claimed in claim 1, wherein:
said overhead data further includes diagnostic information.

8. The disk drive, as claimed in claim 1, wherein:
said at least one customer data region is located on a common track with said multiple servo sectors.

9. The disk drive, as claimed in claim 1, wherein:
each of said plurality of substantially concentric tracks includes at least one customer data region having a dedicated portion for storing overhead data corresponding to multiple servo sectors within said track.

10. The disk drive, as claimed in claim 9, wherein:
each of said plurality of substantially concentric tracks includes multiple customer data regions that each have a dedicated portion for storing overhead data corresponding to multiple servo sectors within said track.

11. The disk drive, as claimed in claim 10, wherein:
said dedicated portions within said multiple customer data regions in a first substantially concentric track are each located a fixed time period from a preceding servo sector mark within said track, with respect to a rotation speed of said data storage disk.

12. The disk drive, as claimed in claim 10, wherein:
said multiple customer data regions within each substantially concentric track represent less than all of said customer data regions within said track.

13. The disk drive, as claimed in claim 10, wherein:
said multiple customer data regions within each substantially concentric track are unevenly distributed about said substantially concentric track.

14. A rotatable storage surface comprising:

a plurality of radially arranged, spaced apart servo sectors which define a plurality of substantially concentric tracks on the surface, the servo sectors storing data at a first frequency; and a plurality of customer data regions placed along the tracks between adjacent pairs of said servo sectors and each storing data at a second frequency different from the first frequency, wherein multiple ones of the customer data regions on a selected track from said plurality of tracks each comprise a dedicated portion for storing overhead data at said second frequency corresponding to multiple servo sectors on the selected track, at least part of the overhead data being redundantly stored in multiple locations in the plurality of customer data regions, and wherein each of the dedicated portions are located a fixed time period from a preceding servo sector mark along the selected track with respect to a rotation speed of the medium;

wherein the overhead data of each of the dedicated portions on the selected track comprises servo sector identification information.

15. The surface of claim 14, wherein the overhead data comprises a write portion and a read portion each radially offset with respect to a centerline of the track in relation to a corresponding radial offset of read and write elements of a transducer adjacent the surface.

16. The surface of claim 14, wherein the overhead data comprises correction values to compensate for repeated runout (RRO) error in position data stored in the associated servo sectors.

17. The surface of claim 14, wherein the overhead data of each of the dedicated portions on the selected track comprise a track address of the selected track.

18. The surface of claim 14, wherein the overhead data of each of the dedicated portions on the selected track are unevenly distributed about the selected track.

19. A rotatable storage surface comprising:

a plurality of radially arranged, spaced apart servo sectors which define a plurality of substantially concentric tracks on the surface, the servo sectors storing data at a first frequency; and a plurality of customer data regions placed along the tracks between adjacent pairs of said servo sectors and each storing data at a second frequency different from the first frequency, wherein at least one of the customer data regions on a selected track from said plurality of tracks comprises a dedicated portion for storing overhead data at said second frequency corresponding to at least one of the servo sectors on the selected track, the overhead data comprising a track address for the selected track.

20. The surface of claim 19, wherein multiple ones of the customer data regions on the selected track each comprise a dedicated portion for storing overhead data at said second frequency corresponding to multiple servo sectors on the selected track.

21. The surface of claim 20, wherein each of the dedicated portions are located a fixed time period from a preceding servo sector mark along the selected track with respect to a rotation speed of the medium.

22. The surface of claim 20, wherein at least one of the customer data regions not having said dedicated portion immediately follows each of the servo sectors on the selected track, and wherein an associated one of the customer data regions having said dedicated portion immediately follows thereafter on the selected track.

23. The surface of claim 19, wherein the overhead data comprises correction values to compensate for repeated runout (RRO) error in position data stored in the associated servo sectors on the selected track.

24. The surface of claim 19, wherein the overhead data comprises servo sector identification information.

25. The surface of claim 19, wherein a first portion of customer data is stored along the selected track between a selected servo sector and the overhead data, and a second portion of customer data is stored between the overhead data and the next adjacent servo sector along the selected track.

* * * * *